United States Patent [19]

Keller

[11] Patent Number: 5,031,790
[45] Date of Patent: Jul. 16, 1991

[54] VENTED FUEL CAP WITH CAM ACTUATED CONNECTOR

[76] Inventor: Russell D. Keller, 149 N. Lotus Beach Dr., Portland, Oreg. 97217

[21] Appl. No.: 446,647

[22] Filed: Dec. 6, 1989

[51] Int. Cl.$^5$ .............................................. B65D 45/00
[52] U.S. Cl. .................................... 220/203; 220/301; 220/303; 220/89.4; 220/DIG. 33
[58] Field of Search .............. 220/203, 204, 295, 301, 220/303, DIG. 33, 89.3, 89.4

[56] References Cited

U.S. PATENT DOCUMENTS

| 1,286,320 | 12/1918 | Hood | 220/301 X |
|---|---|---|---|
| 2,747,763 | 5/1956 | Sach | 220/301 X |
| 3,386,611 | 6/1968 | Crute | 220/301 |
| 4,795,053 | 1/1989 | Kasugai et al. | 220/203 |
| 4,913,303 | 4/1990 | Harris | 220/204 |

Primary Examiner—Stephen Marcus
Assistant Examiner—Nova Stucker
Attorney, Agent, or Firm—Klarquist, Sparkman, Campbell, Leigh & Whinston

[57] ABSTRACT

A vented fuel tank cap and valve assembly is described having a cam actuated connector for connecting the cap to the top of the filler neck tube for the tank. Three vent passages are employed in the cap with common outlet openings. One passage is normally open but includes a float valve which can close such passage when the vehicle tips. A second passage includes a pressure relief valve which opens when the tank pressure exceeds a predetermined pressure. The bias spring for the pressure relief valve also functions as the bias for the cam actuated connector. The third passage includes fusible metal inserts provided in the movable pressure relief valve member to open such passage when the temperature of the tank exceeds the melting point of such inserts. The cam actuated connector includes ramp shaped cam surfaces on the outside of the filler neck tube and cam follower pins on the tank cap which move along the ramps and are urged into locking notches by a coil spring which also operates the pressure relief valve.

20 Claims, 2 Drawing Sheets

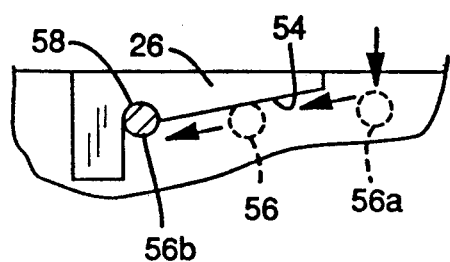
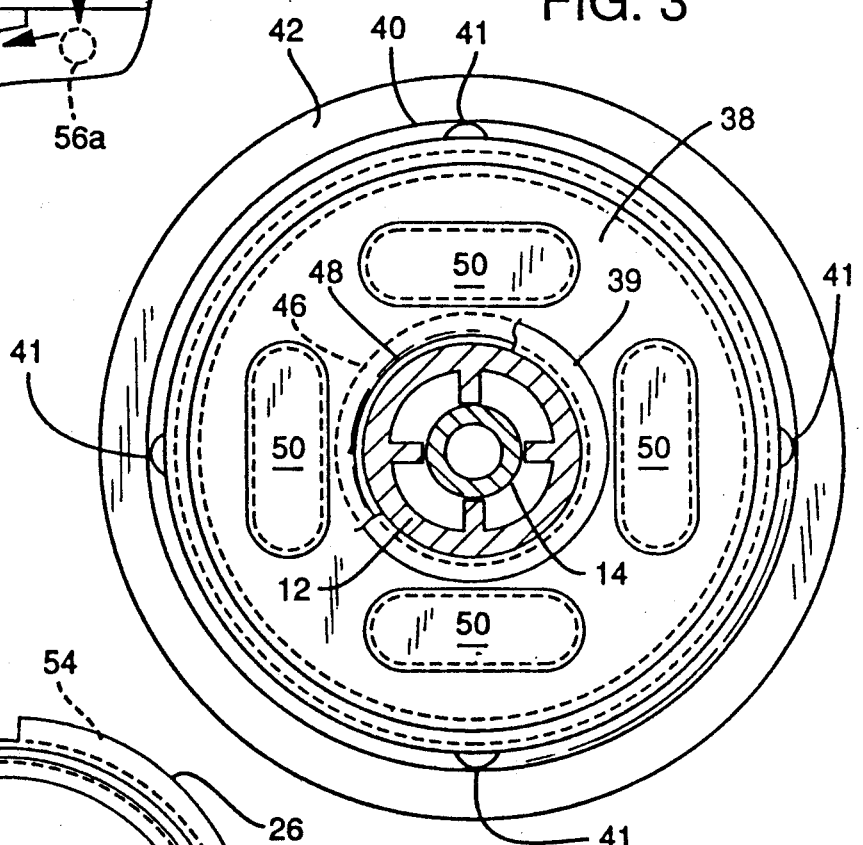
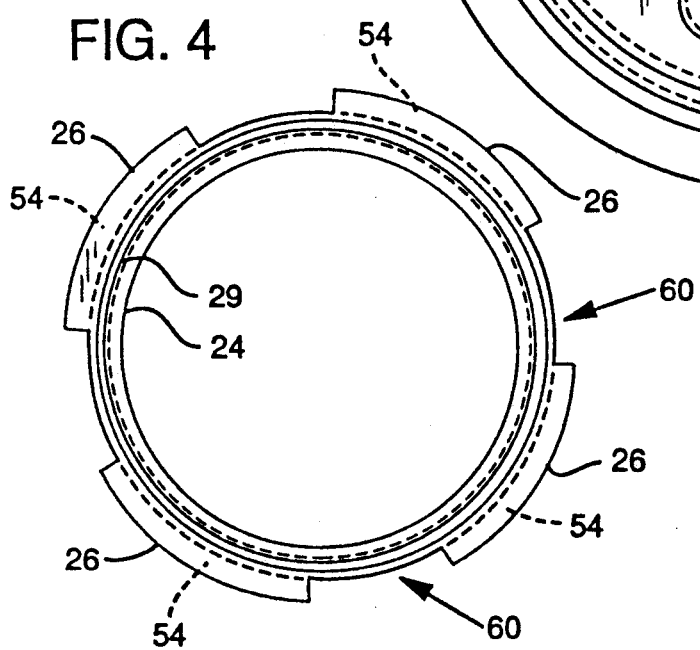

VENTED FUEL CAP WITH CAM ACTUATED
CONNECTOR

BACKGROUND OF THE INVENTION

The present invention relates generally to a liquid tank filler cap and valve assembly, and in particular to a vented fuel tank cap having plurality of vent passages which discharge through common outlet openings and which is attached to the filler tube of the fuel tank by a cam actuated connector. The cam actuated connector includes a ramp-shaped cam surface with a locking notch that is engaged by a cam follower pin in the closed position of the cap to provide a positive indicator that the cap is completely closed to prevent fuel leakage. The fuel tank cap is especially useful for vehicles such as diesel engine trucks and the like. Such cap vents fumes from the tank through a first passage which is normally open but contains a float valve which closes for preventing liquid fuel from spilling in the tank when it tips beyond a predetermined angle of inclination, through a second passage including a pressure relief valve which opens when the pressure within the tank exceeds a predetermined pressure, and through a third passage including fusible metal plugs, which melt to vent the tank above a predetermined temperature such as might be encountered in a fire.

It has been previously proposed in U.S. Pat. No. 4,796,777 of Russell D. Keller, the present inventor, issued Jan. 10, 1989, to provide a vented fuel tank cap with a pressure relief valve and a float valve, as well as with a fusible element for venting the tank above a predetermined temperature through a hole in the top of the cap. However the apparatus shown in such patent is more complicated and expensive than the present invention. In addition it has the disadvantage of connecting the fuel tank cap to the top of the filler tube by means of threads which can cause difficulty in releasing the cap. Thus, when the threads get dirty due to dust, mud and other foreign materials, the cap sometimes sticks and is very hard to remove. Similarly, when the threads have moisture contained therein the cap may freeze closed. These problems are overcome with the vented fuel tank cap of the present invention by employing a cam actuated connector to attach the cap to the top of the tank filler tube for quick and easy removal. Also with the present cap three vent passages are provided including a first passage which is normally open for venting the tank at normal pressure and temperature, a second passage containing a pressure relief valve for venting the tank above a predetermined higher pressure, and a third passage normally closed by fusible metal plugs, which melt above a predetermined temperature. These three passages have common outlet openings for venting all passages through the cam actuated connection between four cam actuators spaced around the periphery of the filler tube. In addition the pressure relief valve is more efficient because it employs a larger vent opening around the entire periphery of the tank fill tube, while the above described prior pressure relief valve vents through a smaller opening in the top of the cap.

It is also previously been proposed in U.S. Pat. No. 4,162,021 of Crute issued July 24, 1979, to provide a pressure vacuum release fuel tank cap with a roll over gravity operated safety valve including a metal ball which closes a vent valve to prevent spillage when the truck rolls over. In addition, this vented fuel tank cap is provided with a cam lock connector for fastening the cap to the inside of the filler neck tube to resist high pressure like a radiator cap. However this has the disadvantage that the cam surface extends into the filler neck and is exposed to the corrosive effects of the fuel contained in such filler neck. The pressure relief valve employed in such cap is much more complicated construction and employs two additional operating springs which are separate from the spring used for closing the cap. In addition there is no disclosure of the use of three vent passages having a common outlet which contain three different valves such as a pressure relief valve, a float valve, and a fusible plug valve to provide safety venting under several different conditions in the manner of the present invention. Also the vent opening for the pressure relief valve is of much smaller area than that of the present invention.

SUMMARY OF THE INVENTION

It is therefore one object of the present invention to provide an improved vented fuel tank cap of simple and economical construction and of efficient trouble-free operation.

Another object of the invention is to provide such a vented fuel tank cap with a cam actuated connector on the outside of the filler neck tube to allow quick release of the cap under adverse conditions.

A further object of the invention is to provide such a vented fuel tank cap with three passages having common outlet openings for venting the fuel tank under different operating conditions in a safe and efficient manner.

An additional object of the invention is to provide such a vented fuel tank cap in which the same spring used to close the cap by means of a cam actuated connector also operates a pressure relief valve in such cap.

Still another object of the invention is to provide such an improved vented fuel tank cap having three vent passages, a float valve in one passage, a pressure relief valve in another passage and fusible metal plugs in the third passage.

Still further object of the invention is to provide such a vented fuel tank cap in which the cam actuated connector includes ramp shaped cam surfaces with locking notches and cam follower pins for a positive indication of when the cap is completely closed to prevent fuel spillage and for easy trouble-free operation.

DESCRIPTION OF DRAWINGS

Other objects and advantages of the present invention will be apparent from the following detailed description of the preferred embodiments thereof and from the attached drawings of which:

FIG. 2 is an enlarged vertical section view taken along a line 2—2 of FIG. 1;

FIG. 3 is horizontal section view taken along a line 3—3 of FIG. 1; and

FIG. 4 is a horizontal section view taken along a line 4—4 of FIG. 1.

DESCRIPTION OF PREFERRED EMBODIMENT

Figure 1:
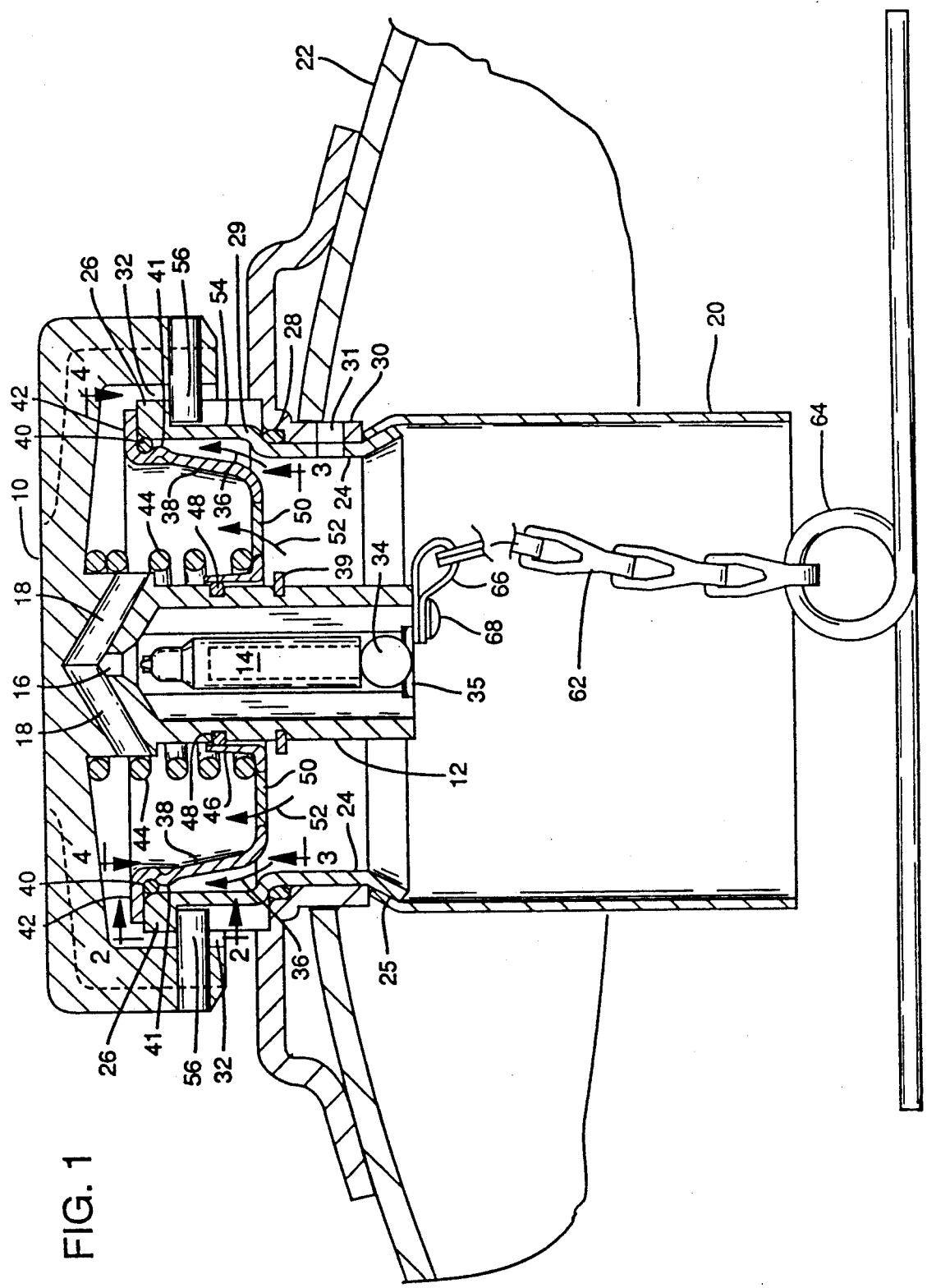
FIG. 1 is a vertical section view through the vented fuel tank cap of the present invention.

As shown in FIG. 1 a vented fuel tank cap and valve assembly in accordance with the present invention includes a cap body 10 made of aluminum or other suitable material which is provided with a valve cage sleeve portion 12 containing a hollow a float valve 14.

The float valve is mounted for vertical sliding movement when the liquid fuel rises to close the input of a normally open first vent passage 16 through the top of the valve sleeve which communicates between the interior of sleeve 12 and passage branches 18 through the side of such sleeve. The cap is releasably fastened to the top of a filler neck tube 20 extending through a fuel inlet opening in the top of a fuel tank 22 containing liquid fuel such as gasoline or diesel oil by a cam actuated connection hereafter described. The filler neck tube 20 has a top portion 24 in the form of a thicker wall tubular member fastened to a lower portion in any suitable manner such as by welding at joint 25. The top neck portion 24 is provided with an external flange 26 extending outwardly from the top thereof on which a ramp shaped cam surface means is provided as shown in FIG. 2. The top neck portion 24 is sealed to the tank by a rubber 0 ring 28 between a shoulder 29 on such top portion and the inside surface of the fuel inlet opening surrounded by an inward extending flange 30 of the tank wall. The top neck portion is fixed to the tank wall flange 30 by a rivet or weld at point 31.

The first vent passage 16, 18 vents the interior of the fuel tank to the atmosphere through common vent outlet openings 32 between the cap body 10 and the outer flange 26 of the neck top portion 24. This first vent passage is normally open and vents fuel vapor from the fuel tank to the atmosphere to prevent a build up of pressure in the tank. When the fuel tank tips beyond a predetermined angle such as when rounding a curve in the road or during a roll over of the truck, the float valve member 14 raises with the liquid level as it floats on the surface of the fuel until it closes the first vent passage at inlet 16 in a manner similar to that described in U.S. Pat. No. 4,796,777 of Keller discussed above. A metal ball weight 34 is secured within the valve cage 12 by a removable bottom member 35, beneath the float member 14 to hold the float valve closed in the event that the truck turns completely upside down so that the float valve will not float into contact to close valve 16 but instead is held closed by the metal ball due to gravity. This prevents spillage of liquid fuel from the tank which could result in an explosion or fire.

A second vent means including a second vent passage 36 is also provided in the cap through a pressure relief valve including a cup shaped valve member 38 of metal having an outer flange 42. The relief valve member 38 is resiliently biased down by a spring 44 to urge a rubber 0 ring 40 retained by four dimples 41 on such valve member, into engagement with the top of the filler neck portion 24 to provide a seal between such neck portion and flange 42 of the relief valve member. The relief valve member 38 is an annular cup shape with a central opening which surrounds the float valve cage sleeve 12 and is engaged by the lower end of the a coil spring 44. The upper end of the bias spring 44 engages the underside of the cap body 10 around the valve cage and above the first vent passage portions 18. Thus spring 44 resiliently urges the relief valve member 32 downward until its outer flange 42 engages the top of the outer flange 26 of the neck portion 24 when the cap is on the filler neck 20, 24. A snap ring 39 provided in a groove in the outer surface of valve cage sleeve 12 serves as a stop which engages the bottom of valve member 38 to hold it and spring 44 on the cap 10 when such cap is removed from the filler neck. The relief valve cup member 38 is provided with an upward extending inner flange 46 which engages an 0 ring seal 48 mounted in a notch in the outer surface of the valve cage sleeve 12 in order to seal the interior of the filler neck tube when the pressure relief valve is normally closed. However, when the pressure within the fuel tank exceeds a predetermined pressure such as approximately 5 to 10 pounds per square inch (psi) above atmospheric pressure, the pressure relief valve opens, since the higher pressure causes the relief valve member 38 to be moved upward against the force of the bias spring 44 thereby opening the second vent passage 36 between the relief valve flange 42 and the top of the outer flange 26 of the filler neck. It should be noted that the second vent passage also exits through the same common outlet openings 32 as the first passage and is of extremely large area due to the fact that it is of a diameter equal to the inside diameter of the top of the filler neck tube. As a result the pressure is immediately relieved to reduce the pressure within the tank to atmospheric pressure when the predetermined pressure is exceeded. It should be noted that such predetermined pressure may be adjusted by varying the size and force of the bias spring 44, but is typically set to a pre-determined relief pressure of about 5.0 to 7.5 psi.

As shown in FIG. 1 and 3 a third vent means is employed to provide a third passage which is normally closed by fusible plugs 50 of a low melting point metal alloy such as Cerro metal, having a melting point of between 188° and 192° F. These fusible metal plugs are mounted in holes provided through the relief valve member 38. Thus the third vent passage 52 extends through the holes normally filled by the fusible plugs 50, when such plugs melt and vents fumes and liquid from the tank through the common vent outlet openings 32 between the cap body and the external flange 26 of the filler neck. In the event of a fire when the temperature exceeds the melting temperature of the fusible plugs 50 such plugs melt and allow escape of the pressure or liquid fuel to prevent an explosion. Thus it can be seen that an extremely simple and safe vented fuel cap structure is provided employing three different vent passages for venting the tank under different conditions.

A cam actuated connection is employed for connecting the cap 10 to the filler neck tube 20 means including a ramp shaped cam surface portion 54 which is provided on the outer flange 26 of the filler neck portion 24 as shown in FIGS. I, 2 and 4. A cam follower member in the form of a cylindrical metal pin 56 is mounted on the cap body member 10 in position to engage the cam surface ramp 54 and move along such ramp as shown in FIG. 2. Preferably there are four cam actuation means uniformly spaced around the top of the filler neck tube and four associated cam follower pins 56 spaced at 90° apart around the periphery of the cap body 10. As shown in FIG. 2, when the fuel tank cap 10 is rotated partially on the order of ⅛ turn or about 45°, the cam follower pin 56 moves from a position 56a where the cap is in an open position along the surface of the cam ramp 54 thereby displacing the cap downward in a longitudinal direction on the filler neck until the pin reaches a locking notch 58 at the top of the cam ramp 54. Once the pin at position 56b enters the locking notch 54 it locks the cap 10 in a closed position. In this closed position the outer flange 42 of the relief valve member 38 is in engagement with the top of the outer flange 26 of the filler neck portion 24 and the bias spring 44 is compressed. Thus the bias spring holds the cam follower pin 56 in the cam lock notch 54 by urging cap 10 upward While the angle of the slope of the cam surface ramp 54 is not critical, it has been found that a slope of between 11 and 13 degrees is satisfactory. Also the length of the cam surface 54 including notch 58 is approximately 55 degrees while the spacing 60 between adjacent cam actuators is approximately 35 degrees for a total of 90 degrees when four such actuators are employed as shown in FIG. 4 The four spaces 60 between adjacent cam actuators 54 provides the common vent outlet openings 32 of the three vent passages. This should be noted that since the pins are of a cylindrical shape they tend to slide with a minimum of friction over the surface of the cam 54 for easy rotation of the vent cap between the open and closed position. In order to open the vent cap a vent cap must be pushed downward slightly against the force of the spring and rotated to move the pin from the locked position 56b to the open position 56a of FIG. 2.

As shown in FIG. 1 the vented fuel tank cap may be secured by a flexible chain 62 attached to one end to an anchor wire 64 within the tank and attached at its other end to a clamp 66 fixed to the bottom of the float valve cage 12 by a screw 68 to prevent loss of the cap.

It will be obvious to those having ordinary skill in the art that many changes may be made in the above described preferred embodiment of the present invention without departing from the spirit of the invention. Therefore the scope of the present invention should be determined by the following claims.

I claim:

1. Fuel tank cap apparatus, comprising:
   a fuel tank cap for closing a fuel inlet of a fuel tank;
   connection means for connecting said cap to a filler tube which extends into said fuel tank and provides said fuel inlet to close said filler tube, said connection means including
   cam means for closing said cap by longitudinal displacement of the cap from an open position to a closed position against a resilient bias member in response to movement of a cam follower along a cam surface by partial rotation of said cap in a first direction, and for opening said cap from said closed position to said open position in response to partial rotation of said cap in a second direction opposition to said first direction; and
   fusible means for opening a vent passage through said connection means when said fusible means melts.

2. Apparatus in accordance with claim 1 which also includes cap vent means for venting said filler tube to the atmosphere through said connection means when the fuel tank cap is in said closed position.

3. Apparatus in accordance with claim 1 in which the vent means includes a first vent means for venting through a first passage means at low tank pressures within the fuel tank and a second vent means for venting through a second passage means having pressure relief valve at high tank pressures greater than said low tank pressures.

4. Apparatus in accordance with claim 3 in which the first passage means has a float valve which closes when the fuel tank tips beyond a predetermined angle to prevent liquid fuel from being discharged from said fuel tank through said first passage.

5. Apparatus in accordance with claim 3 in which the vent means includes a third vent means for venting through a third passage means having a fusible plug means which melts above a predetermined temperature to open said third passage.

6. Apparatus in accordance with claim 1 in which the cam surface means has a ramp portion and cam follower means which moves along said cam surface.

7. Apparatus in accordance with claim 6 in which the cam surface means includes a notch at the top of the ramp and cam follower means includes a pin which enters said notch to lock the connection means in said closed position.

8. Apparatus in accordance with claim 1 in which the cam surface means is provided on the top of said filler tube and cam follower means is provided on the cap.

9. Apparatus in accordance with claim I in which the cam means includes a plurality of spaced cam surface means each having a ramp portion and a notch at the top of said ramp portion into which a cam follower pin enters to lock the cap in said closed position.

10. Fuel tank cap apparatus, comprising:
    a fuel tank cap for closing a fuel inlet of a fuel tank;
    connection means for connecting said cap to a filler tube which extends into said fuel tank and provides said fuel inlet to close said filler tube, said connection means including
    can means for closing said cap by longitudinal displacement of the cap from an open position to a closed position against a resilient bias member in response to movement of a cam follower along a cam surface by partial rotation of said cap in a first direction, and for opening said cap from said closed position to said open position in response to partial rotation of said cap in a second direction opposition to said first direction;
    vent means for venting said filler tube to the atmosphere through said connection means when the fuel tank cap is in said closed position, said vent means including a pressure relief valve which engages the top end of said filler tube and is urged closed by said resilient bias member; and
    fusible means for opening a vent passage though said pressure relief valve and said connection means when said fusible means melts.

11. Apparatus in accordance with claim 10 in which the pressure relief valve includes a cup shaped retainer member that holds a spring forming the resilient bias member between said cap and said retainer member, and seal means for sealing said retainer member across the top of said filler tube until the pressure within the tank exceeds a predetermined pressure.

12. Apparatus in accordance with claim 10 in which the vent means includes a first vent means for venting through a first passage means at low tank pressures within the fuel tank and a second vent means for venting through a second passage means having pressure relief valve at high tank pressures greater than said low tank pressures.

13. Apparatus in accordance with claim 12 in which the first passage means has a float valve which closes when the fuel tank tips beyond a predetermined angle to prevent liquid fuel from being discharged from said fuel tank through said first passage.

14. Apparatus in accordance with claim 12 in which the vent means includes a third vent means for venting through a third passage means having a fusible plug means which melts above a predetermined temperature to open said third passage.

15. Apparatus in accordance with claim 10 in which the cam surface means has a ramp portion and cam follower means which moves along said cam surface.

16. Apparatus in accordance with claim 15 in which the cam surface means includes a notch at the top of the ramp and cam follower means includes a pin which enters said notch to lock the connection means in said closed position.

17. Apparatus in accordance with claim 10 in which the cam surface means is provided on the top of said filler tube and cam follower means is provided on the cap.

18. Apparatus in accordance with claim 10 in which the cam means includes a plurality of spaced cam surface means each having a ramp portion and a notch at the top of said ramp portion into which a cam follower pin enters to lock the cap in said closed position.

19. Apparatus in accordance with claim 10 in which the resilient bias member is a spring.

20. Apparatus in accordance with claim 19 in which the spring is held between the fuel tank cap and a retainer member which engages the top end of the filler tube and is provided with a plurality of fusible plugs which melt above a predetermined temperature to provide a vent passage.

* * * * *

UNITED STATES PATENT AND TRADEMARK OFFICE
CERTIFICATE OF CORRECTION

PATENT NO.  : 5,031,790
DATED       : July 16, 1991
INVENTOR(S) : Russell D. Keller It is certified that error appears in the above-identified patent and that said Letters Patent is hereby corrected as shown below:

```
Column 1, line 62,  "is" should be --has--.
Column 2, line 42,  "Still further" should be --Still a further--.
Column 2, line 58,  "is" should be --is a--.
Column 2, line 68,  "hollow a" should be --hollow--.
Column 3, line 55,  "the a coil" should be --the coil--.
Column 4, line 46,  "FIGS. I, 2" should be --FIGS. 1, 2--.
Column 4, line 68,  "upward While" should be --upward. While--.
Column 5, line 7,   "FIG. 4 The" should be --FIG. 4. The--.
```

<u>In the Claims</u>:

```
Column 5, line 36,  "including" should be --including;--.
Column 5, line 44,  "opposition" should be --opposite--.
Column 6, line 12,  "claim I" should be --claim 1--.
Column 6, line 22,  "including" should be --including;--.
Column 6, line 31,  "opposition" should be --opposite--.
Column 6, line 39,  "though" should be --through--.
```

Signed and Sealed this

Ninth Day of February, 1993

*Attest:*

STEPHEN G. KUNIN

*Attesting Officer*  Acting Commissioner of Patents and Trademarks